(12) United States Patent
Quazi et al.

(10) Patent No.: US 6,359,395 B1
(45) Date of Patent: Mar. 19, 2002

(54) CONTROL CIRCUIT FOR POWER FACTOR CORRECTED ELECTRONIC BALLASTS AND POWER SUPPLIES

(76) Inventors: Fazle S. Quazi, 1075 Roxwood La., Boulder, CO (US) 80303; Jay Lutsky, 4807 S. Zang Way, Morrison, CO (US) 80465

( * ) Notice: Subject to any disclaimer, the term of this patent is extended or adjusted under 35 U.S.C. 154(b) by 0 days.

(21) Appl. No.: 09/730,981

(22) Filed: Dec. 6, 2000

(51) Int. Cl.[7] .................................................. G05F 1/00
(52) U.S. Cl. ...................... 315/307; 315/209 R; 315/224
(58) Field of Search ............................. 315/307, 209 R, 315/224, 291, 244

(56) References Cited

U.S. PATENT DOCUMENTS 5,479,074 A * 12/1995 Nilsen ...................... 315/209 R
6,011,362 A *  1/2000 Moisin ........................ 315/307
6,023,132 A *  2/2000 Crouse et al. ............... 315/307

* cited by examiner

*Primary Examiner*—Don Wong
*Assistant Examiner*—Jimmy T. Vu
(74) *Attorney, Agent, or Firm*—Patton Boggs LLP

(57) ABSTRACT

The control circuit provides an improved method for power factor correction characteristics and low Electro Magnetic noise. This control circuit uses an Electro Magnetic Interference abatement circuit that consists of a series connected diode in one of the DC input lines from the full wave rectifier and a capacitor connected across the DC input lines from the full wave rectifier to eliminate the Electro Magnetic Interference generated by the active power factor corrections and resonant circuit operations. This is accomplished in part by the operation of the series connected diode which blocks reverse currents, thereby preventing high frequency current present in the gas discharge control circuit from flowing back to the AC input line through the full wave rectifier. In addition, the use of the capacitor across the DC input line helps to absorb high frequency current that is present on the input lines from the full wave rectifier. The cost of these two elements is small compared to the use of an inductor, yet their synergistic effect on the input lines provides a significant abatement of the Electro Magnetic Interference generated by the active power factor corrections in conjunction with resonant circuit operations for such devices as gas discharge lamp ballasts and power supplies.

12 Claims, 6 Drawing Sheets

CONTROL CIRCUIT FOR POWER FACTOR CORRECTED ELECTRONIC BALLASTS AND POWER SUPPLIES

FIELD OF THE INVENTION

This invention relates to a control circuit that controls the application of a high frequency alternating voltage signal for power supply and gas discharge lamp operations with active power factor corrections.

Problem

It is a problem in the field of electronic power supplies and gas discharge lamp ballasts to produce an inexpensive and simple control circuit that provides all control functions including active power factor corrections. The typical architecture of an electronic gas discharge lamp circuit is such that a high frequency alternating current is used to power the circuit. The low frequency 50/60 Hz input alternating power source is first converted into a DC power by a full wave rectifier. This DC power source is then converted into to a high frequency alternating power source, usually higher than 20 kHz, to provide the power to the gas discharge lamp.

After full wave rectification, In order to reduce the variations in the DC voltage, often a large smoothing capacitor is used. The current drawn by the smoothing capacitor causes harmonic distortions in the input AC line at times when the smoothing capacitor is charging. The charging time of the smoothing capacitor is very small if a large smoothing capacitor is used and all the required charge is loaded into the smoothing capacitor in a short period of time. This rapid charging of the smoothing capacitor at the peaks of AC sinusoids is the cause for harmonic distortions and low power factor.

A control circuit that controls the operation of the gas discharge lamp operation may also be used for active power factor corrections. The gas discharge lamp control circuit of U.S. Pat. No. 4,511,823 addresses these problems and provides methods for active power factor corrections, but in doing so generates a significant amount of Electro Magnetic Interference (EMI) and feeds this interference back to the input power line. The Electro Magnetic Interference is due to the use of part of the resonant circuit energy for active power corrections. By adding a large inductor to this control circuit, the interference problem can be limited, but this adds a significant additional cost and space. Thus, this solution is not cost effective, in particular, given the cost sensitivity of gas discharge lamp ballasts.

Solution

The above described problems are solved and a technical advance achieved by the present control circuit that provides an improved method for power factor correction characteristics and low Electro Magnetic noise. This new control circuit uses an Electro Magnetic Interference abatement circuit that consists of a series connected diode in one of the DC input lines from the full wave rectifier and a capacitor connected across the DC input lines from the full wave rectifier to eliminate the Electro Magnetic Interference generated by the power factor and gas lamp control circuits. This is accomplished in part by the operation of the series connected diode which blocks reverse currents, thereby preventing high frequency current present in the electronic device from flowing back to the AC input line through the full wave rectifier. In addition, the use of the capacitor across the DC input line helps to absorb high frequency current that is present on the input lines from the full wave rectifier. The cost of these two elements is small compared to the use of an inductor, yet their synergistic effect on the input lines provides a significant abatement of the Electro Magnetic Interference generated by the power factor correction and gas discharge lamp control circuits.

DETAILED DESCRIPTION

The term power factor represents a phase relationship between an AC input voltage and current. Mathematically, the power factor (PF) is proportional to the cosine (cos) of the phase angle (x) between the input voltage (V) and current (I) sinusoidal signals, or: PF=VI cos x. In order to reduce the peak current drawn from the AC line, it is desirable to maintain the power factor as close to the unity as possible. Unity power factor is achieved when the input voltage and current are in phase with each other. Another consideration in power circuits is the Total Harmonic Distortion (THD), which relates to the shape of the input current waveform, as the current is drawn from the AC line by the electronic devices. The harmonics are reduced when the power is drawn from the AC line in a sinusoidal manner.

The present power company requirements are for a high power factor and low total harmonic distortions, which are conventionally achieved by using a Boost converter. However, power factor corrections by means of boost converter technique and by the methods as described in U.S. Pat. No. 4,511,823 are expensive and require more space.

Resonant Tank Circuit Operation

One way of achieving active power factor correction is to use a resonant tank circuit, which consists of a series connected inductor LR and capacitor CR. In order to make the resonant tank circuit operational, it is switched between the plus and minus sides of a DC source by power switches. When the switching frequency of the circuit equals the natural commutating frequency of series connected inductor LR and capacitor CR, they form a resonant tank circuit.

Figure 7:
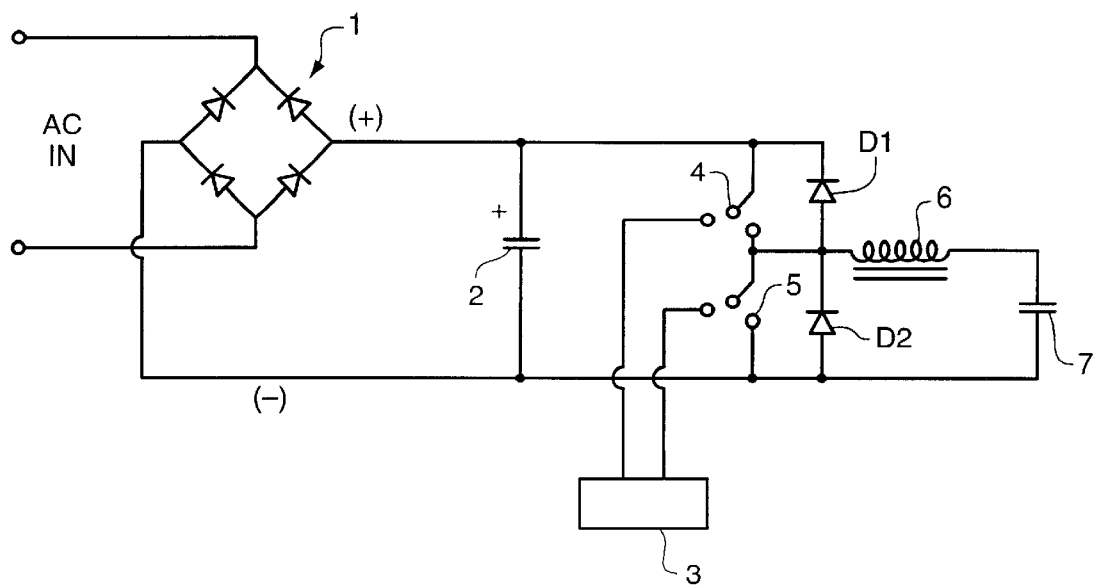
FIG. 7 illustrates an off-line resonant inverter circuit.

Important characteristics of a resonant inverter include zero voltage or zero current switching of power switches, sinusoidal current flow into the resonant tank circuit, automatic ignition voltage generation for gas discharge lamps, etc. A block diagram of an off-line resonant inverter is shown in FIG. 7, where bridge rectifier 1 rectifies an input AC voltage to produce a DC voltage which is applied to a filter capacitor 2. Control circuit 3 generates alternate drive pulses to operate power switches 4, 5. The elements D1 and D2 are catch diodes. The elements 6 and 7 are the resonant inductor and the resonant capacitor, which comprise a tank circuit. When drive pulses from control circuit 3 turn on and turn off the power switches 4 and 5 at a complimentary manner and at the rate whose frequency is equal to the natural commutating frequency of the resonant inductor 6 and the resonant capacitor 7, then current flows sinusoidally in the tank circuit. In particular, when switch 4 closes, positive current flows in the tank circuit. Then switch 4 opens and switch 5 closes, causing negative current flow in the tank circuit. Under resonant conditions, the reactive impedance of resonant inductor 6 is equal and opposite to the capacitive impedance of resonant capacitor 7 in this circuit. Therefore, these impedances cancel each other.

Figure 8:
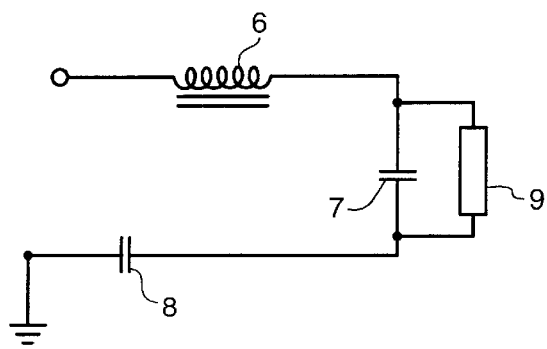
FIGS. 8–11 illustrate various load connections that can be used with the off-line resonant inverter circuit of FIG. 7.
Figure 9:
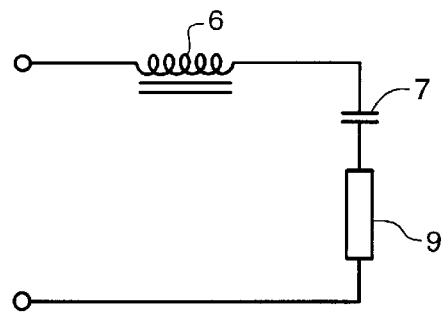
Figure 10:
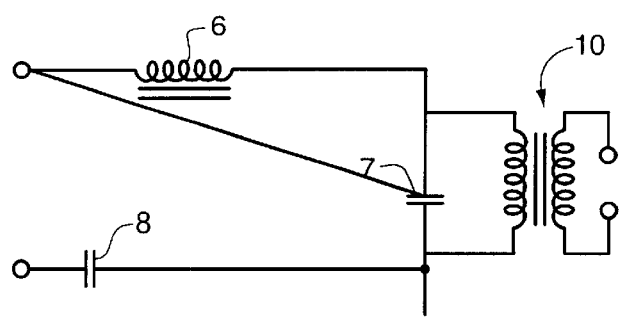
Figure 11:
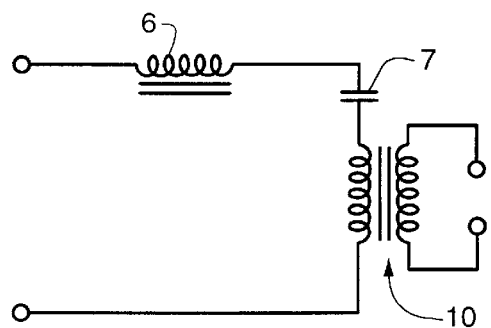

The tank circuit, which consists of the resonant inductor 6 and the resonant capacitor 7, can be used to drive a load 9 or a high frequency transformer 10 in various ways. The secondary side of the high frequency transformer can be used in such applications as for driving a gas discharge lamp or for providing isolated power source for a DC power supply. A few popular examples of various resonant inverter arrangements are shown in FIGS. 8, 9, 10 and 11. In FIGS. 8 and 10, the capacitor 8 is a DC blocking capacitor. One must note that there exist many variations for feeding a transformer 10 or other types of loads 9 (such as a gas discharge lamp) to a resonant tank circuit and those illustrated in FIGS. 8–11 are simply examples. When a load 9 or a transformer 10 is placed in parallel with the resonant capacitor 7, as shown in FIGS. 8 and 10, it is often termed a parallel resonant arrangement. Whereas, when a load 9 or a transformer 10 is placed in series with the resonant capacitor 7, as shown in FIGS. 9 and 11, it is often termed a series resonant arrangement. In a parallel resonant arrangement, a part of the resonant current flows into the load. In the series resonant arrangement, all of the resonant current flows through the load.

Figure 12:
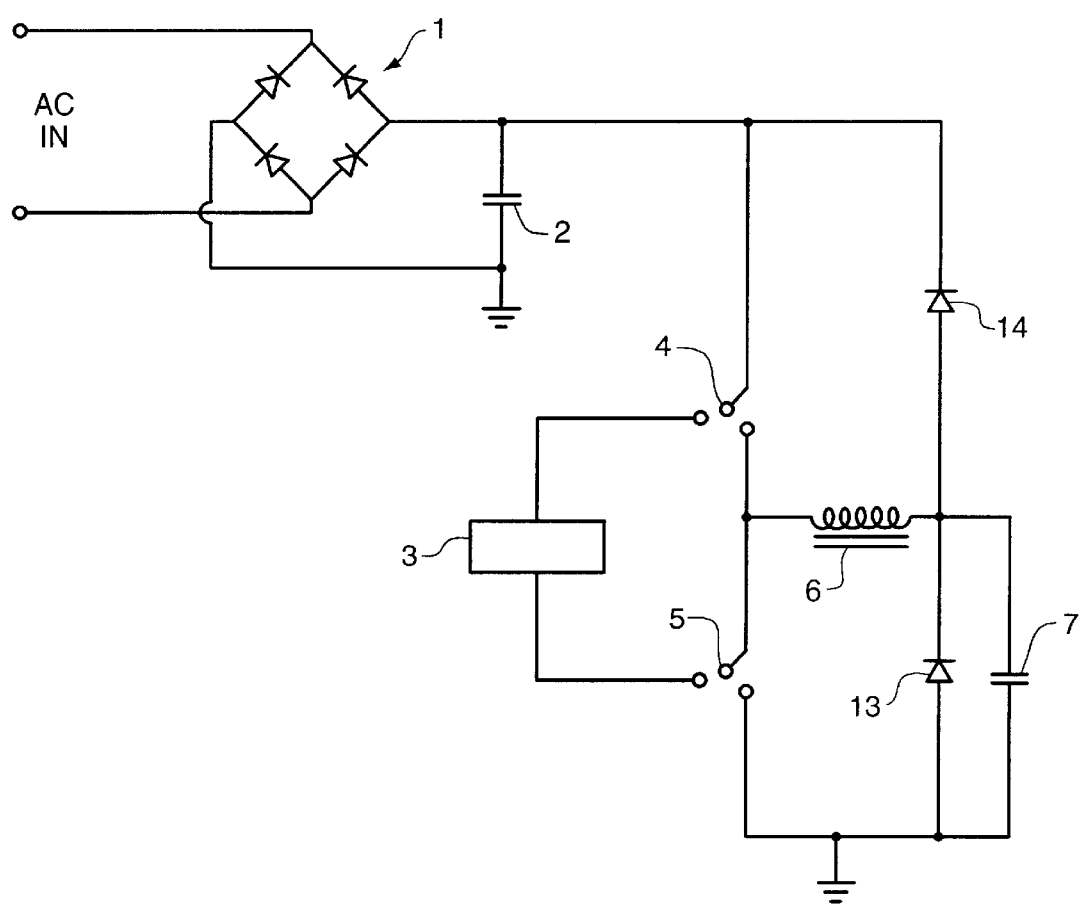
FIG. 12 illustrates a variation of the off-line resonant inverter circuit of FIG. 7 where two clamping diodes are added to the resonant capacitor.

FIG. 12 is a variation of FIG. 7, where two clamping diodes 13 and 14 are added to the resonant capacitor 7. The diode 14 clamps the negative part of the voltage equal to the circuit ground potential. As described earlier, under the resonant condition the overall impedance of a tank circuit is zero. Therefore, without these clamping diodes 13, 14 the voltage that develops across resonant capacitor 7 would be enormously high. The only limiting factors are the Q values of the resonant inductor 8 and the resonant capacitor 7. In fact, this particular property of a resonant circuit is often utilized to ignite a gas discharge lamp.

Prior Art Gas Discharge Lamp Control Circuits

Figure 3:
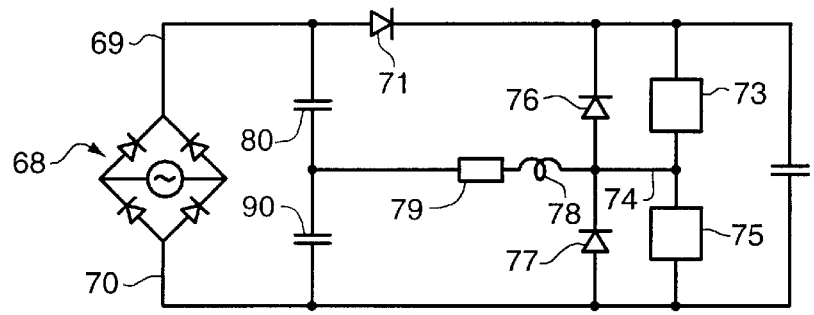
FIGS. 3 and 4 illustrate gas discharge lamp control circuits of the prior art.
Figure 4:
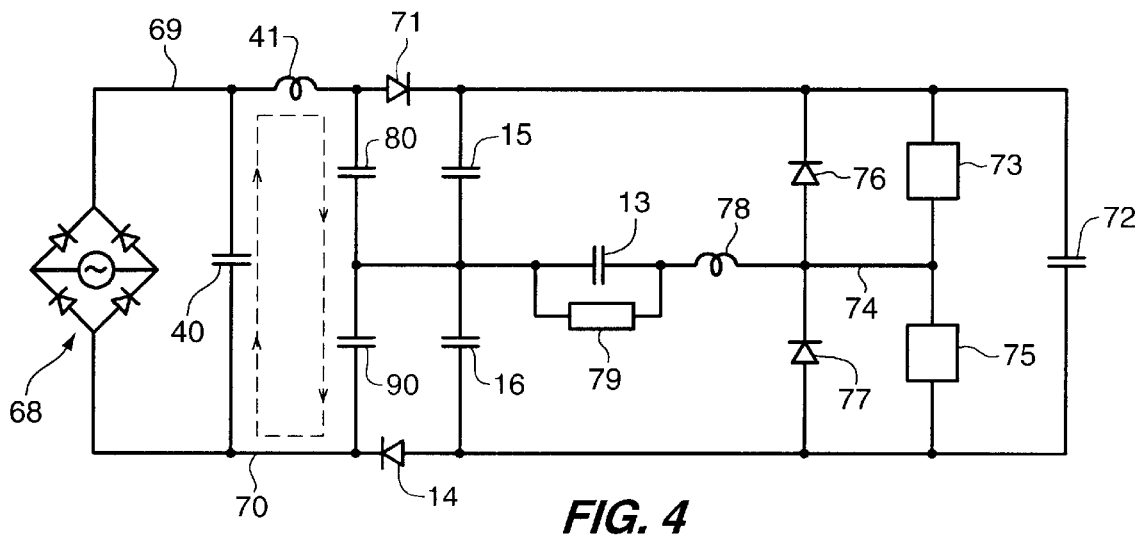
Figure 5:
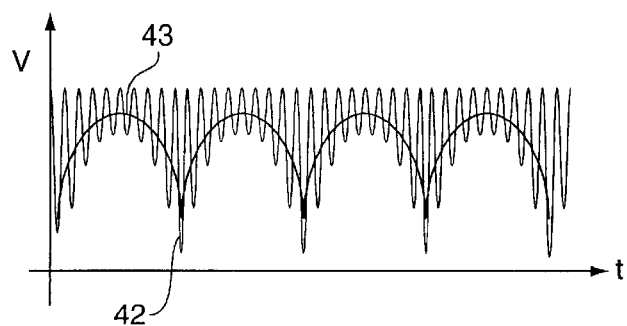
FIG. 5 is a waveform diagram that illustrates the voltage signal that appears on the DC input line that carries a positive voltage, at junction of the input capacitor and diode, of the circuits of FIGS. 3 and 4.

FIGS. 3 and 4 illustrate gas discharge lamp control circuits of the prior art U.S. Pat. No. 4,511,823 and FIG. 5 is a waveform diagram that illustrates the voltage signal that appears on the DC input line that carries a positive voltage, at the junction of the input capacitor and diode, of the circuits of FIGS. 3 and 4. For the sake of simplicity, FIGS. 15 and 16 of the U.S. Pat. No. 4,511,823 are presented as FIGS. 3 and 4 herein and like elements are numbered the same in FIGS. 3 and 4. These circuits use the concepts described above with regard to resonant inverters.

A source of AC voltage is used to power the gas discharge lamp circuit. The AC voltage is converted by bridge rectifier 68 into a Direct Current (DC) voltage that is applied to a pair of DC input lines 69, 70, with DC input line 69 carrying a positive polarity and DC input line 70 carrying the negative voltage. Smoothing capacitor 72 is connected across the pair of DC input lines 69, 70 and provides a smoothing function, removing voltage fluctuations from the DC voltage appearing on the pair of DC input lines 69, 70. Conventional high frequency switching devices 73, 75 provide a high frequency alternating current to an output line 74, which is used to power the load connected thereto. The high frequency switching devices 73, 75 are controlled by a conventional switching control circuit (not shown) that generates the gating signals used to drive the switching devices 73, 75. Ringing diodes 76, 77 are connected across the switching devices 73, 75. The output line 74 drives a series resonant circuit comprising an inductor 78 and gas discharge lamp 79. This resonant circuit load is connected by control capacitors 80 and 90 to the positive 69 and negative 70 input lines, respectively. Thus, elements 76–80, 90 form a series resonant tank circuit as described above. The diode 71 and smoothing capacitor 72 enable this series resonant tank circuit to achieve a high power factor.

However, the voltage signal that appears across the AC input line at the junction of the input capacitor 80 and diode 71 contains a significant amount of high frequency noise as shown in FIG. 5, where the AC input line voltage is graphed as a function of time. As can be seen from FIG. 5, significant high frequency components 43 are superimposed on the rectified AC main frequency 42. The high frequency components 43 flow back into the input AC line and create an Electro Magnetic Interference problem. This problem can be addressed by the addition of an inductor 41 and capacitor 40, as shown in FIG. 4. But the additional cost of these elements and the space they occupy render this solution unacceptable. This is due to the fact that the size of the inductor is related to the load that is being controlled and in most applications, this size and cost are significant.

Basic Components of an Improved Gas Discharge Lamp Control Circuit

Figure 1:
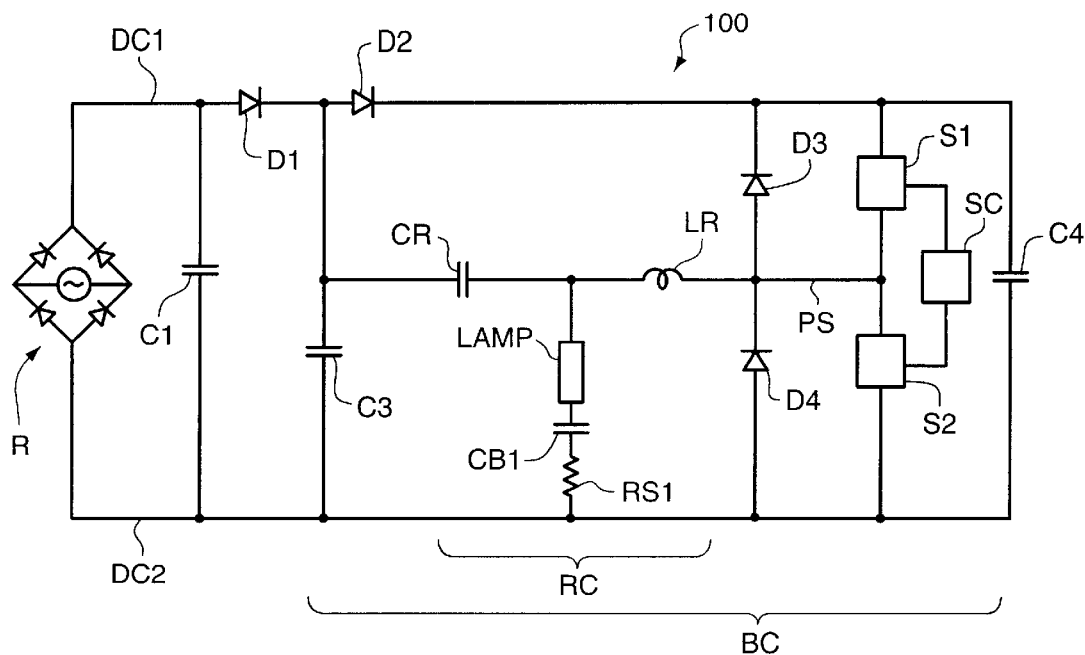
FIG. 1 illustrates the present gas discharge lamp control circuit and an environment in which it is operational.
Figure 2A:
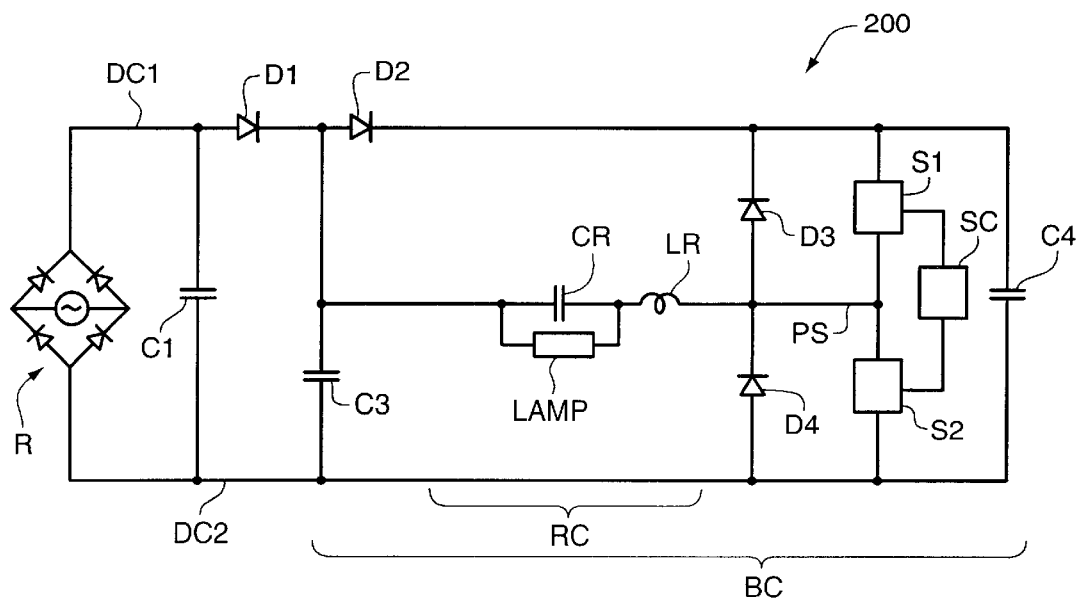
FIGS. 2A–2C illustrate alternative embodiments of the present gas discharge lamp control circuit and an environment is which it is operational.
Figure 2B:
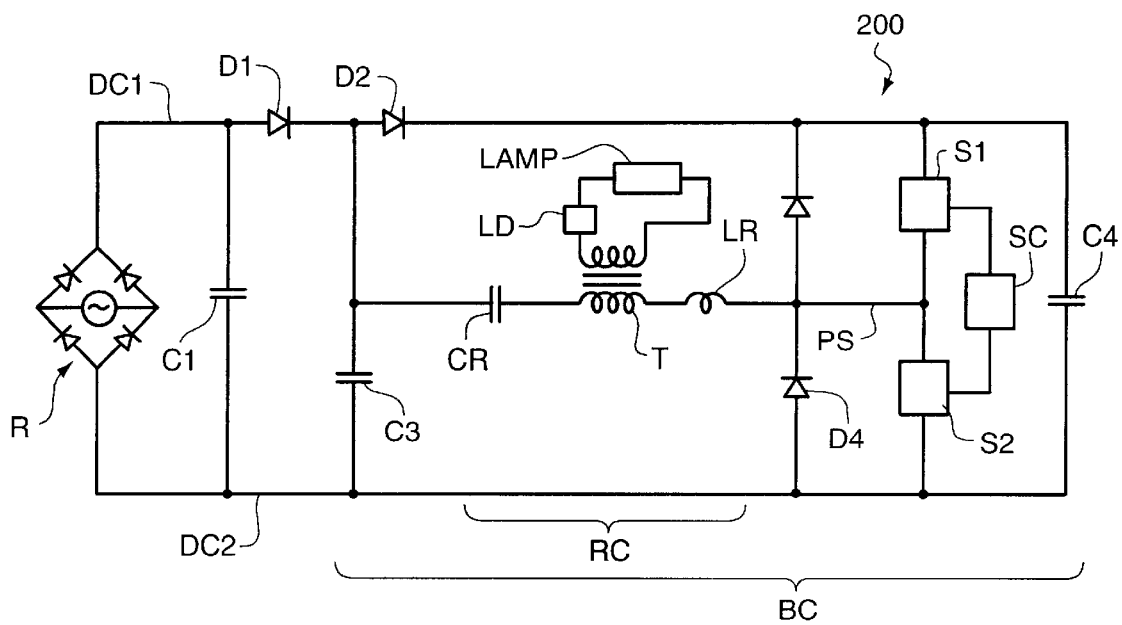
Figure 2C:
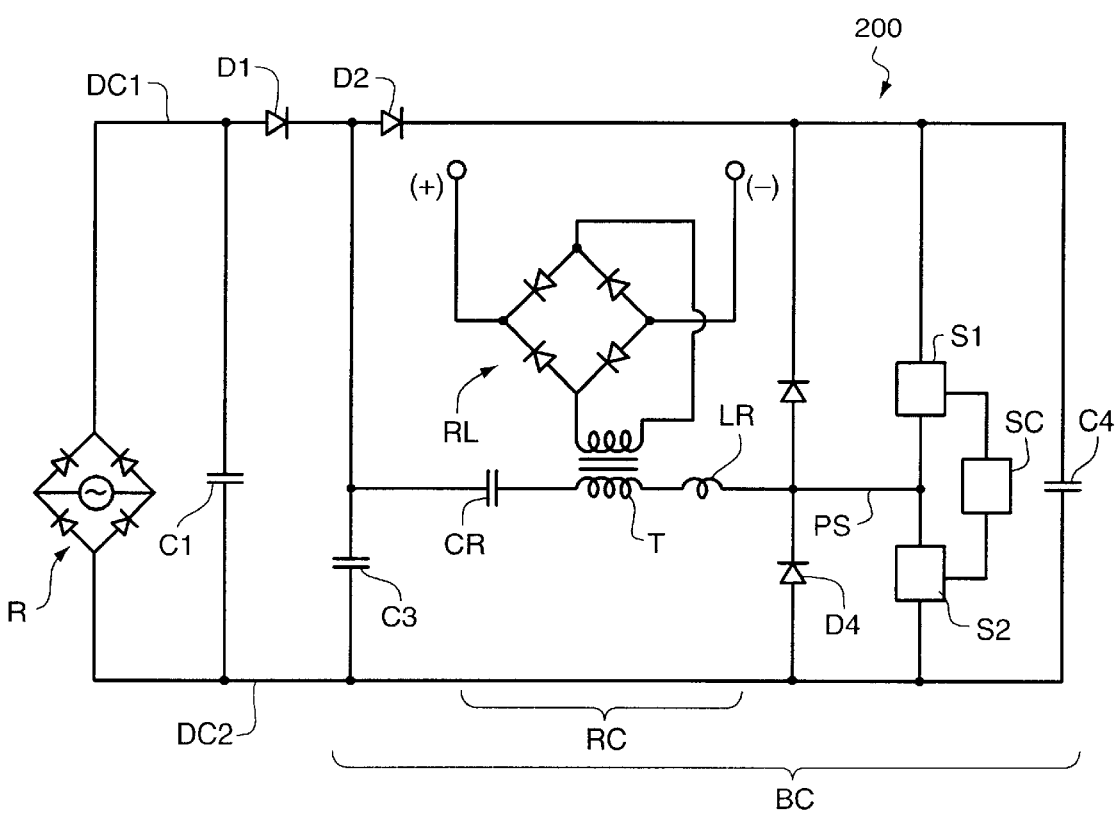

FIG. 1 illustrates the present gas discharge lamp control circuit 100 and an environment is which it is operational and FIGS. 2A–2C illustrate alternative embodiments of the present gas discharge lamp control circuit 200 and an environment is which it is operational. For the sake of simplicity, like elements are numbered the same in FIGS. 1, 2A–2C.

It is the goal of this gas discharge lamp control circuit 100 to obtain a high power factor by utilizing part of resonant tank circuit energy. It is also the goal of this gas discharge lamp control circuit 100 to prevent high frequency components flowing back into the input AC line without adding a bulky and expensive inductor. As shown in FIGS. 1, 2A–2C, a source of AC voltage is used to power the gas discharge lamp circuit. The AC voltage is converted by bridge rectifier R into a Direct Current (DC) voltage that is applied to a pair of DC input lines DC1, DC2, with DC input line DC1 carrying a positive polarity and DC input line DC2 carrying the negative voltage. A basic control circuit BC is connected across the pair of DC input lines DC1, DC2. This basic control circuit BC includes smoothing capacitor C4 connected across the pair of DC input lines DC1, DC2 and provides a smoothing function, removing voltage fluctuations from the DC voltage appearing on the pair of DC input lines DC1, DC2. Conventional high frequency switching devices S1, S2 provide a high frequency alternating current to an output line PS, which is used to power the load connected thereto. The high frequency switching devices S1, S2 are controlled by a conventional switching control circuit SC that generates the gating signals used to drive the switching devices S1, S2. Clamping diodes D3, D4 are connected across the switching devices S1, S2.

Power Factor Correction Using Resonant Circuit Energy

The basic control circuit BC is a variation of the resonant circuit of FIG. 7. In fact, this simple variation is what accomplishes the active power factor correction and as well as prevents high frequency current flowing back into the input AC line. Unlike the resonant circuit of FIG. 7, the resonant capacitor CR is connected between the resonant inductor LR and the junction of the diodes D1 and D2. In FIG. 7, this resonant capacitor 7 was connected between the resonant inductor 7 and the circuit ground. In the present circuit, due to the orientation of the diode D2, only the positive part of the resonant voltage that develops at the junction of the resonant capacitor CR can reach to the filter capacitor C4. The diode D1 prevents high frequency current flowing back into the input AC line. The function of capacitor C1 is to further suppress high frequency components. Through experiments it was found that for achieving unity power factor, the value of the capacitor C3 required to be almost equal to the value of the resonant capacitor CR.

Under a no load condition, the resonant voltage that develops across the capacitor C3 can be much higher than the input peak AC voltage. The higher voltage, in turn, raises the voltage across the smoothing capacitor C4 to a higher level than the input peak AC voltage. Voltage rise can be limited by means of pulse width modulation technique or by increasing the inverter operating frequency above the resonance frequency. These can be achieved by taking advantage of the programming and feedback capabilities of switch mode control circuit SC. Only one control circuit SC is needed for performing most of these functions. In fact, since inverter load regulations are usually accomplished by means of either pulse width modulation or frequency variation techniques, the same may be used for light intensity control, that is, dimming of a gas discharge lamp.

The voltage that appears across capacitor C1 is composed of rectified sinusoids. This voltage source acts as a variable clamping source for the high frequency commutating voltage that develops at the junction of the capacitors CR and C3. Ordinarily, if an external DC source is applied across the filter capacitor C4, the voltage that appears across the capacitor C3 is clamped to approximately equal to the magnitude of the applied DC voltage. However, because the input AC voltage that appears across capacitor C1 is rectified sinusoids, clamping magnitudes follow the sinusoid voltage excursions. In other words, at the instant when the sinusoid voltage is at its minimum, the voltage that appears across the capacitor C3 is approximately equal to the DC voltage level that appears across the filter capacitor C4. Whereas, at the instant when the sinusoid voltage is at its peak, the voltage across the capacitor C3 is approximately equal to the DC voltage across the filter capacitor C4 minus the input sinusoid peak voltage. Further, these sinusoidal voltage excursions happen at the rate of input AC line frequency. Therefore, current drawn from the power line is sinusoidal and synchronous to the line frequency. In ideal situations the phase difference between current and voltage drawn is zero. As stated earlier these are the conditions for obtaining high power factor and low harmonic distortions. By properly selecting component values under a given load condition, the method of this invention can yield a power factor of 0.99 and total harmonic distortions of less than 10%.

The method of obtaining high power factor and low harmonic distortions using the techniques of this invention is indeed a simple approach but very beneficial because the same resonant tank circuit that feeds a load can also be used for active power factor corrections. Therefore, power conversion efficiency remains high and board spacing increase is no longer required. Furthermore, by placing one additional diode between the AC rectifier and the trapped resonant circuit energy, this invention also prevents high frequency current from flowing back into the input AC line.

Operation of the Basic Components of the Control Circuit

The basic control circuit BC of the gas discharge control circuit operates in well known fashion to convert the DC voltage produced by full wave rectifier R into drive signals that are applied to output lead PS to drive gas discharge lamp to produce the illumination from the gas discharge lamp. The gas discharge lamp load can also be replaced by a high frequency transformer for providing isolated power to a gas discharge lamp or to the rectifier of a DC power supply. The following description generally characterizes the operation of the resonant circuit load that is connected to the output lead PS. The operation of the basic control circuit BC is described in a plurality of operational cycles, which occur seriatim and are then repeated as the current is applied in pulses to the gas discharge lamp.

Switch S1 turns on for a period which is approximately equal to the half of the resonant inverter operating frequency. Switch S2 also turns on for a similar period. However, switches S1 and S2 do not turn on at the same time. While S1 is on, S2 remains in the off state and vice versa. Further, in order to avoid any cross conduction between these two switches, there exists a preset dead time when neither of the switches are in an on state. During the positive half of the input waveform when S1 is turned on by the switching control circuit SC, a single current path exists from the positive voltage carried on DC input line DC1 through the resonant circuit load RC. When S1 turns off and before S2 turns on, the current in the inductor LR reverses to negative polarity, which, in turn, creates fly-back inductor voltage. The diode D4 clamps this fly-back voltage to a potential equal to the potential of DC2. During negative half of the input waveform when switching device S2 turns on, the negative energy into the inductor LR is returned to the rectifier R via negative voltage DC input line DC2. When the switch S2 is turns off and before switch S1 turns on, the current in the inductor LR reverses to positive polarity. The diode D3 clamps inductor fly-back voltage to a potential that is equal to the smoothing capacitor C4 voltage.

When switching control circuit SC turns on switching device S1, it establishes a discharge path from smoothing capacitor C4 through the switching device S1 through resonant circuit load RC to charge control capacitor C3 and thence along the negative voltage DC input line DC2 to return to the smoothing capacitor C4. During this time, the charging of the control capacitor C3 in series with the resonant circuit load RC causes the resonant circuit load RC voltage to increase and, as soon as the voltage across the resonant circuit load RC is higher than that across control capacitor C3 plus the diode drop of diode D2, the control capacitor C3 discharges through diode D2, switching device S1 and the resonant circuit load RC to return to itself. During the negative half cycle when S2 is on, a negative voltage is developed across the control capacitor C3. As described earlier that this negative voltage gets clamped by the input sinusoid that appears across the capacitor C1.

This cycle repeats as the switching control circuit SC turns on and off the switching devices S1 and S2 as described above. This operation of the basic components of the gas discharge lamp control circuit is conventional. However, as noted above that the channeling part of the energy from the lamp resonant circuit for the purpose of active power factor corrections results in the generation of a significant amount of Electro Magnetic Interference. The addition of various Electro Magnetic Interference abatement circuitry to the circuit described above significantly improves performance without incurring a significant incremental cost over the basic circuit described above. In addition, the reconfiguration of the resonant circuit load RC as shown in FIG. 1 produces improved performance.

First Embodiment of the Gas Discharge Lamp Control Circuit

In a first embodiment of the present gas discharge lamp control circuit 100 as shown in FIG. 1, the output line PS drives a series-parallel resonant circuit RC comprising an inductor LR and capacitor CR in series in a first leg of the resonant circuit RC and with a gas discharge lamp, capacitor CB1 and resistor RS1 in series in a second leg of the resonant circuit. The first leg of this series-parallel resonant circuit RC is connected to the positive DC1 and negative DC2 input lines. The second leg of the series-parallel resonant circuit RC is connected directly to the negative polarity DC input line DC2. This control circuit uses an Electro Magnetic Interference abatement circuit that consists of a series connected diode D1 in one of the DC input lines from the full wave rectifier R and a capacitor C1 connected across the DC input lines DC1, DC2 from the full wave rectifier R to eliminate the Electro Magnetic Interference generated by the gas discharge lamp circuit, which consists of the gas discharge lamp and its associated control circuit. This is accomplished in part by the operation of the series connected diode D1 which blocks reverse currents, thereby preventing high frequency current present in the gas discharge control circuit from flowing back to the AC input line through the full wave rectifier R. In addition, the use of the capacitor C1 across the DC input line DC1, DC2 helps to absorb high frequency current that is present on the input lines DC1, DC2 from the full wave rectifier R. The cost and size of these two elements are small compared to the use of an inductor, yet their synergistic effect on the DC input lines DC1, DC2 provides a significant abatement of the Electro Magnetic Interference generated by the gas discharge lamp and its associated control circuit.

The series-parallel resonant circuit RC is returned to the negative side of the DC input line DC2 via a blocking capacitor CB1 and current sense resistor RS1. The current sense resistor RS1 serves to sense the total lamp current. The circulating current that flows into the resonant capacitor CR does not flow into the series-parallel resonant circuit RC. Total lamp current sensing is important for proper lamp starting, lamp operating and end of lamp life detection.

Second Embodiment of the Gas Discharge Lamp Control Circuit

In a second embodiment of the present gas discharge lamp control circuit 200, as shown in FIGS. 2A–2C, the output line PS drives a series resonant circuit RC comprising an inductor LR connected in series with a parallel connected capacitor CR and gas discharge lamp. This series resonant circuit RC is connected to the positive DC1 and negative DC2 input lines. This control circuit uses an Electro Magnetic Interference abatement circuit that consists of a series connected diode D1 in one of the DC input lines from the full wave rectifier R and a capacitor C1 connected across the DC input lines DC1, DC2 from the full wave rectifier R to eliminate the Electro Magnetic Interference generated by the gas discharge lamp circuit, which consists of the gas discharge lamp and its associated control circuit. This is accomplished in part by the operation of the series connected diode D1 which blocks reverse currents, thereby preventing high frequency current present in the gas discharge control circuit from flowing back to the AC input line through the full wave rectifier R. In addition, the use of the capacitor C1 across the DC input line DC1, DC2 helps to absorb high frequency current that is present on the input lines DC1, DC2 from the full wave rectifier R. The cost and size of these two elements are small compared to the use of an inductor, yet their synergistic effect on the DC input lines DC1, DC2 provides a significant abatement of the Electro Magnetic Interference generated by the gas discharge lamp and its associated control circuit.

Figure 6:
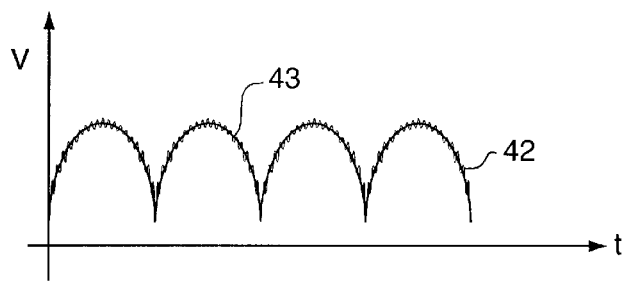
FIG. 6 is a waveform diagram that illustrates the voltage signal that appears on the DC input line that carries a positive voltage, at junction of the input capacitor and diode, of the circuits of FIGS. 1 and 2.

FIG. 6 is a waveform diagram that illustrates the voltage signal that appears on the DC input line that carries a positive voltage, at the junction of the input capacitor and diode, of the circuits of FIGS. 1, 2A–2C. However, the voltage signal that appears across the DC input line at the junction of the input capacitor C1 and diode D1 is shown in FIG. 5 graphed as a function of time. As can be seen from FIG. 5, the high frequency components 43 superimposed on the rectified AC main frequency 42 are far less than in the prior art system. The high frequency components 43 do not flow back into the input AC line and create an Electro Magnetic Interference problem as in the prior art.

FIG. 2B shows an isolated power supply for the gas discharge lamp, which may be a fluorescent lamp. Before the lamp ignition, voltage that develops across the secondary of the transformer T is much higher causing the ignition of the lamp. Once the lamp ignites and it starts to draw current, the voltage across the secondary of the transformer T drops to normal lamp operating voltage for proper operation of the lamp. However, in order to limit current immediately following the lamp ignition often it may be necessary to add an impedance-limiting device LD, which may be a capacitor or an inductor.

FIG. 2C shows an isolated power supply to produce a DC voltage. The voltage that develops across the secondary of the transformer T is used to supply a full wave bridge rectifier RL that converts the secondary voltage of the transformer T into a D.C. voltage.

Summary

The gas discharge lamp control circuit has improved power factor correction characteristics over existing gas discharge lamp control circuits and low noise output. This control circuit uses an Electro Magnetic Interference abatement circuit that consists of a series connected diode in one of the DC input lines from the full wave rectifier and a capacitor connected across the DC input lines from the full wave rectifier to eliminate the Electro Magnetic Interference generated by the gas discharge lamp circuit, which consists of the gas discharge lamp and its associated control circuit.

What is claimed:

1. A control circuit that interconnects an output line to a gas discharge lamp, said control circuit being connected to a source of DC voltage, having first and second terminals, said control circuit being powered by a DC voltage applied from said source of DC voltage across a pair of input lines, the control circuit comprising:

a basic control circuit comprising:
a smoothing capacitor connected across said pair of input lines,
a pair of switching devices connected in series across said pair of input lines, said output line being connected to the junction of said pair of serially connected switching devices, there being a switching control associated with the switching devices for switching the switching devices to conduct alternatively between positive and negative ones of said pair of input lines at a predetermined high frequency, there being a finite time between each of the switching during which both of said switching devices are in a non-conductive state, a resonant load including gas discharge lamp connected at a first end to said output line, a return path for connecting a second end of said load circuit to both of said pair of input lines;

an electromagnetic interference suppression circuit connected between said source of DC voltage and said basic control circuit, comprising:

a unidirectional device serially connected between said first terminal of said source of DC voltage and a first of said pair of input lines to prevent current from flowing from said basic control circuit to said source of DC voltage, and a filter capacitor connected across said first and said second terminals of said source of DC voltage.

2. The control circuit of claim 1 wherein said unidirectional device comprises:

diode means having an anode terminal and a cathode terminal, said anode terminal being connected to said first terminal of said source of DC voltage and said cathode terminal being connected to said first of said pair of input lines.

3. The control circuit of claim 1 wherein said resonant load comprises:

inductive element means having first and second terminals, and being connected at said first terminal to said output line;

gas discharge lamp means connected in series between said second terminal of said inductive element means and said return path for connecting a second end of said load circuit to both of said pair of input lines; and capacitor means connected in parallel with said gas discharge lamp means.

4. The control circuit of claim 3 further comprising:

a path for conducting charge from said inductive element means in said resonant load to charge the smoothing capacitor during said finite time between each of the switching during which both of the switching devices are in a non-conductive state.

5. The control circuit of claim 1 wherein said resonant load comprises:

inductive element means having first and second terminals, and being connected at said first terminal to said output line;

capacitor means connected in series with said second terminal of said inductive element means and said return path for connecting a second end of said load circuit to both of said pair of input lines.

6. The control circuit of claim 5 wherein said resonant load further comprises:

gas discharge lamp means having first and second terminals, and being connected at said first terminal to said second terminal of said inductive element means;

capacitor means connected in series with said gas discharge lamp means at said second terminal of said gas discharge lamp means; and resistor means connected in series with said capacitor means at said second terminal of said gas discharge lamp means.

7. The control circuit of claim 6 further comprising:

a path for conducting charge from said inductive element means in said resonant load to charge the smoothing capacitor during said finite time between each of the switching during which both of the switching devices are in a non-conductive state.

8. The control circuit of claim 1 wherein said resonant load comprises:

inductive element means having first and second terminals, and being connected at said first terminal to said output line;

transformer means having first and second terminals of a primary winding and first and second terminals of a secondary winding, and being connected at said first terminal of said primary winding to said second terminal of said inductive element means; and capacitor means having first and second terminals, and being connected at said first terminal to said second terminal of said primary winding of said transformer means and being connected at said second terminal to both of said pair of input lines.

9. The control circuit of claim 8 wherein said resonant load further comprises:

gas discharge lamp means having first and second terminals being connected at said first and second terminals respectively to said first and second terminals of said secondary winding of said transformer means.

10. The control circuit of claim 8 wherein said resonant load further comprises:

full wave rectifier means having first and second input terminals connected to said first and second terminals respectively of said secondary winding of said transformer means.

11. The control circuit of claim 1 further comprising:

the magnitude of the control capacitor being proportioned for a given said resonant load to cause sufficient current flow originating from said pair of input lines to provide together with any other current flow through said resonant load excluding such flow resulting from discharge of the smoothing capacitor at least all of the circuit losses and anticipated load loss to cause the voltage over the smoothing capacitor to remain at least as high as the DC voltage.

12. The control circuit of claim 1 wherein said resonant load comprises:

a control capacitor connected to be charged in series with said resonant load, during on times of said switching devices, by discharge from the smoothing capacitor to cause a lowering of the voltage across said resonant load.

* * * * *